United States Patent
Renangi et al.

(10) Patent No.: US 12,470,726 B2
(45) Date of Patent: Nov. 11, 2025

(54) VALIDATION FRAMEWORK FOR MEDIA ENCODE SYSTEMS

(71) Applicant: Intel Corporation, Santa Clara, CA (US)

(72) Inventors: Karteek Renangi, Folsom, CA (US); Syed Ahsan, Folsom, CA (US); Dmitry Ryzhov, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 820 days.

(21) Appl. No.: 17/644,253

(22) Filed: Dec. 14, 2021

(65) Prior Publication Data
US 2022/0109825 A1 Apr. 7, 2022

(51) Int. Cl.
*H04N 19/42* (2014.01)
(52) U.S. Cl.
CPC .................................. *H04N 19/42* (2014.11)
(58) Field of Classification Search
CPC ....................................................... H04N 19/42
USPC .................................................... 375/240.01
See application file for complete search history.

(56) References Cited

U.S. PATENT DOCUMENTS

| 2022/0109825 A1* | 4/2022 | Renangi ............... H04N 19/177 |
| 2024/0212154 A1* | 6/2024 | Vashist ..................... G06T 7/62 |
| 2025/0088648 A1* | 3/2025 | Presta .................... H04N 19/42 |

FOREIGN PATENT DOCUMENTS

WO WO-2023031632 A1 * 3/2023

* cited by examiner

*Primary Examiner* — Albert Kir
(74) *Attorney, Agent, or Firm* — Hanley, Flight & Zimmerman, LLC

(57) ABSTRACT

This disclosure describes a validation framework for media encode systems. An example method may include generating, by a system associated with a video encoder simulation model, a first set of video encoding parameters. The example method may also include generating, by the system associated with the video encoder simulation model, a second set of video encoding parameters. The example method may also include sending the second set of video encoding parameters to an encoder device. The example method may also include receiving, by a second device, the first output. The example method may also include receiving, by the second device, a second output, wherein the second output represents second encoded video content generated by the encoder device based on the second set of video encoding parameters. The example method may also include performing a validation of the encoder device by comparing the first output and the second output.

17 Claims, 6 Drawing Sheets

VALIDATION FRAMEWORK FOR MEDIA ENCODE SYSTEMS

TECHNICAL FIELD

This disclosure generally relates to systems, devices, and methods for video encoding and, more particularly, to a validation framework for media encode systems.

BACKGROUND

Validation of an encode pipeline may typically depend on the availability of standard reference codec tools and helper functions so that the stimulus for the encode pipelines can be established. The reference codec tools feed into a reference architectural model (which behaviorally implements encode algorithms) that programs the encoder hardware and enables memory comparison. Different reference codec tools may be required for each codec that the encoder hardware needs to be validated against. Thus, there is an inherent dependency on such reference codec tools being available before the encoder hardware under test can be validated. Also, the reference codec tools may constrain what can be validated in the encoder hardware, which translates to troubles in converging on coverage triggering multiple iterations delaying time to market.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements, which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

Figure 1:
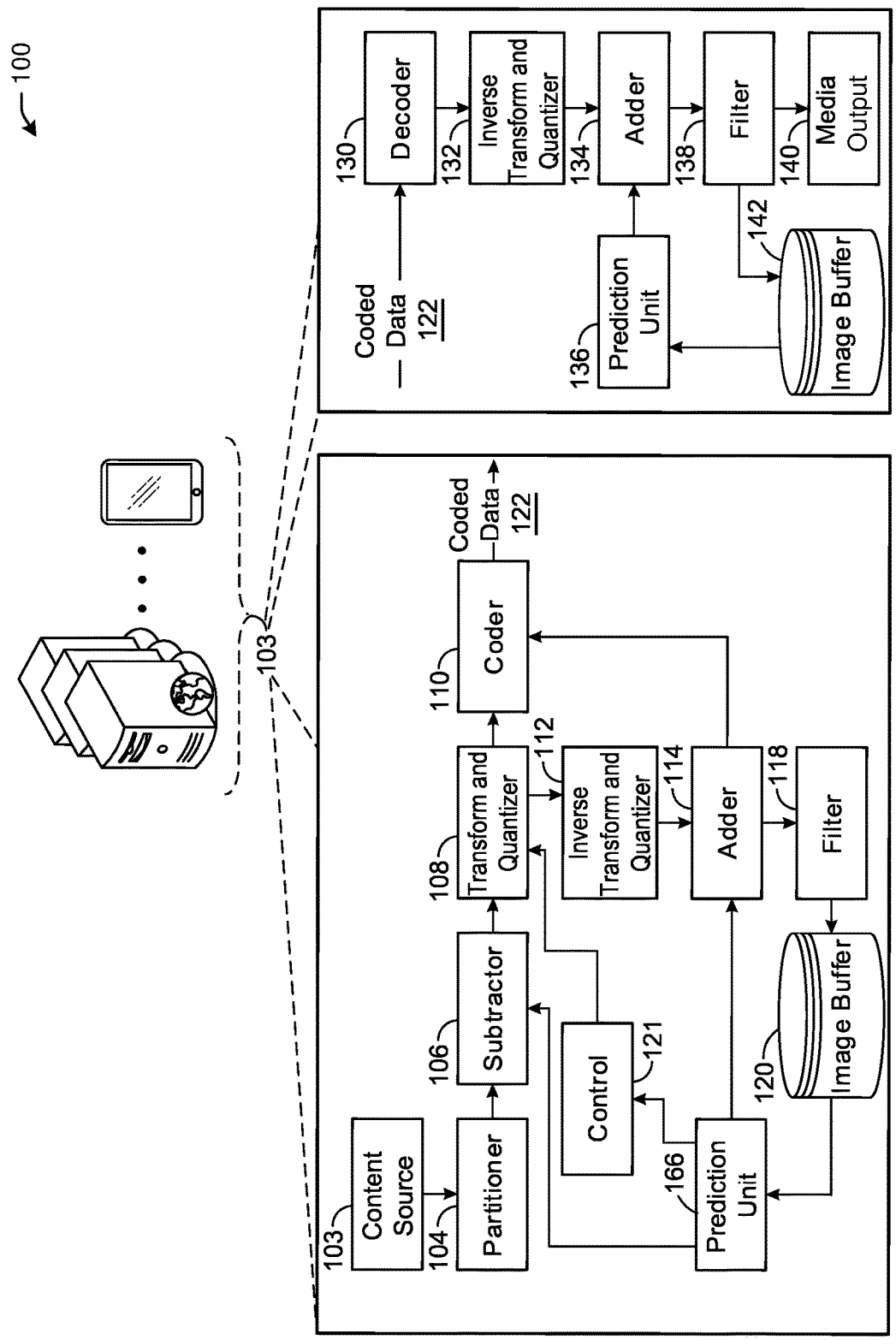
FIG. 1 illustrates an example system, in accordance with one or more embodiments of the disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

A typical video encoding and decoding system may include a transmitting device configured to receive source video and compress (e.g., encode) video data of the source video for transmission to a receiving device. This compressed data may be transmitted to the receiving device as a "bit stream." The receiving device may be configured to decode the compressed video data received from the transmitting device. For example, the transmitting device may be a source of video content and the receiving device may be a device on which a viewer is watching the video content (and/or the receiving device may be a third device that may decode the video and provide the decoded video content to the device on which the viewer is watching the video content). The video content at the source may be compressed to maximize video quality and throughput by allowing a video frame including a large number of pixels to be compressed into a smaller amount of data to provide for quicker transmission and processing at the receiving device.

At a high-level, the encoding process may involve at least the following operations. First, a video frame may be received in the form of a number of pixels. The video frame may be separated into different coding units (CU), which may include groups of pixels included in the frame and/or information associated with the pixels, such as luma and chroma information. A predicted block may be generated, which may involve comparing the pixel data associated with the current frame to a reference image, which may be representative of a previously coded frame in the video content (e.g., inter-coding), and/or which may be representative of previously coded pixel data of the same frame (e.g., intra-coding). The predicted block then may be subtracted (e.g., at a subtractor) from the current block of original image data, and the resulting residual (e.g., representing the difference between the predicted block and the original image data) may be partitioned into one or more transform blocks (TUs). The TUs may then be provided to a forward transform stage at which the pixel data included in the TU is converted into a domain of transform coefficients. Following this, the transformed TU is provided to a quantizer stage. The forward transform and the quantizer stages can transform the divided residual data into transform coefficients using discrete cosine transform (DCT) for example. Using a quantization parameter (QP) set by the system, the transform and quantizer then uses lossy resampling or quantization on the coefficients. The frames and residuals along with supporting or context data block size and so forth may be entropy encoded by the coder and transmitted to the receiving device. The forward transform process may involve multiplying the TU matrix (for example, a 4×4 TU would be a matrix including four rows and four columns) by a constant matrix including pre-determined constant values.

The output of the transform and quantizer may be provided to the inverse transform and quantizer to generate the same reference or reconstructed blocks, frames, or other units as would be generated at a decoder such as decoder. Thus, the prediction unit may use the inverse transform and quantizer, adder, and filter to reconstruct the frames.

The prediction unit may perform inter-prediction including motion estimation and motion compensation, intra-prediction according to the description herein, and/or a combined inter-intra prediction. The prediction unit may select the best prediction mode (including intra-modes) for a particular block, typically based on bit-cost and other factors. The prediction unit may select an intra-prediction and/or inter-prediction mode when multiple such modes of each may be available. The prediction output of the prediction unit in the form of a prediction block may be provided both to the subtractor to generate a residual, and in the decoding loop to the adder to add the prediction to the reconstructed residual from the inverse transform to reconstruct a frame. In this regard, an intra feedback loop may exist at the encoder side.

While decoder hardware may be expected to comply with a particular video coding specification (for example, Versatile Video Coding (VVC), AOMedia Video 1 (AV1), etc.), encoder hardware design may not necessarily be as restricted in the same manner as decoder hardware. This results in more custom encoder hardware solutions, which brings the potential for inconsistencies in video encoding based on the particular encoder hardware that a consumer uses. Given this, validation of any encoder hardware may be important to ensure that the data being provided to the decoder hardware is sufficient to produce the required video quality for the end-user. It should be noted that although encoder hardware and decoder hardware are described throughout this application, encoders and decoders may be implemented in software rather than hardware as well.

In one or more embodiments, conventional encoder validation systems use external reference codec tools and helper functions. These external reference codec tools and helper functions are configured to produce encoder parameters that are compliant with a given video coding specification. For example, the encoding parameters may include factors such as bitrate, rate distortion or scene characteristics, prediction and/or transform partition or block sizes, available prediction mode types, and best mode selection parameters, as well as any other parameters that may be used by an encoder to determine how to encode video content. Using the encoding parameters, the transform and quantizer may generate and quantize transform units to facilitate encoding by the coder, which may generate coded data that may be transmitted (e.g., an encoded bit stream). The reference codec tool may receive one or more user requirements as inputs. The user requirements may specify information relating to use cases that a user may wish to validate. For example, the user requirements may include information such as video resolution, etc. The reference codec tool includes a reference encoder and a reference decoder that are configured for the particular codec that is being validated. Thus, a source image or video and user requirements may be provided to the reference encoder as inputs, and the reference encoder may encode the data included within the source image or video according to the particular video codec. The encoded data may then be provided to the reference decoder, which may decode the encoded data to produce the encoder parameters. The reference codec tool may also include a bit stream compliance component to verify whether any data included within the reference codec tool is compliant with the video codec specification. Finally, the one or more helper functions may convert the encoder parameters produced by the reference decoder into a syntax that is usable by a reference model (described below).

Additionally, a given reference codec tool may only be configured for a single type of video codec. For example, a first external reference codec tool may be configured to produce encoder parameters that may be used for validation of the encoder with respect to a first type of codec, and a second external reference codec tool may be configured to produce encoder parameters that may be used for validation of the encoder with respect to a second type of codec. Thus, it may be required to physically swap different reference codec tools in order to validate an encoder against different types of video codecs. This can be a time-consuming process that may require multiple different external tools in order to perform validation of the encoder with respect to various types of video codecs.

Continuing through the conventional encoder validation system process, the output of the codec tool and helper function may be provided to a reference model, which may be a software simulation. The reference model may represent an emulation of desired hardware encoder functionality (that is, the desired functionality of the encoder being validated). The reference model may receive at least the source image or video and/or the encoder parameters produced by the reference codec tool. The reference model may then provide these encoder parameters and the source image or video to the encoder being validated. The reference model may also encode the source image or video based on the encoding parameters to produce reference encoded outputs. These reference encoded outputs may represent the desired encoded output that should be produced by the encoder being validated. These reference encoded outputs may be provided to a hardware checker that may also receive the actual encoded outputs produced by the encoder being validated. The reference encoded outputs may then be compared to the actual encoded outputs to determine if the encoded outputs produced by the encoder being validated are the correct outputs.

In contrast with this conventional approach to encoder validation, the improved validation system described herein may eliminate the need for the external reference codec tools and/or helper functions. By doing so, the hardware requirements to perform validation of an encoder may be reduced and the complexity of the validation system may be reduced.

In one or more embodiments, the validation may be performed without requiring the external reference codec tools by leveraging a feedback loop used to train the reference model to also validate the encoder hardware. Before being used to produce simulated outputs that may be compared against the outputs produced by the encoder hardware given an input source image or video and/or one or more encode parameters, the reference model may need to be trained to produce proper outputs. This feedback loop may involve the generation of source image or videos and/or encode parameters to train the reference model. Thus, instead of relying on external reference codec tools, this same feedback loop may also be used for generation of source image or videos and/or encode parameters for purposes of validating the encode hardware as well. In this manner, the same software-based feedback loop associated with the reference model may be used for the dual purposes of training the reference model and generating encode parameters for validation of encoder hardware.

In one or more embodiments, the training of the reference model may be performed by generating random source image or videos and/or encoding parameters to ensure that the reference model is trained for different use cases. In addition to the random generation, the system may also allow a user to manually input source image or videos and/or encoding parameters to ensure that use cases of interest are covered. The feedback loop may also include a coverage algorithm. The coverage algorithm may be used to determine whether all of the relevant use cases that may be required to properly train the reference model have been generated. The use of the feedback loop to generate the encode parameters for validation purposes may be further described with respect to FIGS. 3-4.

Still referring to FIG. 1, the devices 102 may receive coded data (e.g., the coded data 122) in a bit stream, and a decoder 130 may decode the coded data, extracting quantized residual coefficients and context data. An inverse transform and quantizer 132 may reconstruct pixel data based on the quantized residual coefficients and context data. An adder 134 may add the residual pixel data to a predicted block generated by a prediction unit 136. A filter 138 may filter the resulting data from the adder 134. The filtered data may be output by a media output 140, and also may be stored as reconstructed frames in an image buffer 142 for use by the prediction unit 136.

Referring to FIG. 1, the system 100 performs the methods of intra prediction disclosed herein, and is arranged to perform at least one or more of the implementations described herein including intra block copying. In various implementations, the system 100 may be configured to undertake video coding and/or implement video codecs according to one or more standards. Further, in various forms, video coding system 100 may be implemented as part of an image processor, video processor, and/or media processor and undertakes inter-prediction, intra-prediction, predictive coding, and residual prediction. In various implementations, system 100 may undertake video compression and decompression and/or implement video codecs according to one or more standards or specifications, such as, for example, H.264 (Advanced Video Coding, or AVC), VP8, H.265 (High Efficiency Video Coding or HEVC) and SCC extensions thereof, VP9, Alliance Open Media Version 1 (AV1), H.266 (Versatile Video Coding, or VVC), DASH (Dynamic Adaptive Streaming over HTTP), and others. Although system 100 and/or other systems, schemes or processes may be described herein, the present disclosure is not necessarily always limited to any particular video coding standard or specification or extensions thereof except for IBC prediction mode operations where mentioned herein.

As used herein, the term "coder" may refer to an encoder and/or a decoder. Similarly, as used herein, the term "coding" may refer to encoding via an encoder and/or decoding via a decoder. A coder, encoder, or decoder may have components of both an encoder and decoder. An encoder may have a decoder loop as described below.

For example, the system 100 may be an encoder where current video information in the form of data related to a sequence of video frames may be received to be compressed. By one form, a video sequence (e.g., from the content source 103) is formed of input frames of synthetic screen content such as from, or for, business applications such as word processors, power points, or spread sheets, computers, video games, virtual reality images, and so forth. By other forms, the images may be formed of a combination of synthetic screen content and natural camera captured images. By yet another form, the video sequence only may be natural camera captured video. The partitioner 104 may partition each frame into smaller more manageable units, and then compare the frames to compute a prediction. If a difference or residual is determined between an original block and prediction, that resulting residual is transformed and quantized, and then entropy encoded and transmitted in a bit stream, along with reconstructed frames, out to decoders or storage. To perform these operations, the system 100 may receive an input frame from the content source 103. The input frames may be frames sufficiently pre-processed for encoding.

The system 100 also may manage many encoding aspects including at least the setting of a quantization parameter (QP) but could also include setting bitrate, rate distortion or scene characteristics, prediction and/or transform partition or block sizes, available prediction mode types, and best mode selection parameters to name a few examples.

The output of the transform and quantizer 108 may be provided to the inverse transform and quantizer 112 to generate the same reference or reconstructed blocks, frames, or other units as would be generated at a decoder such as decoder 130. Thus, the prediction unit 116 may use the inverse transform and quantizer 112, adder 114, and filter 118 to reconstruct the frames.

The prediction unit 116 may perform inter-prediction including motion estimation and motion compensation, intra-prediction according to the description herein, and/or a combined inter-intra prediction. The prediction unit 116 may select the best prediction mode (including intra-modes) for a particular block, typically based on bit-cost and other factors. The prediction unit 116 may select an intra-prediction and/or inter-prediction mode when multiple such modes of each may be available. The prediction output of the prediction unit 116 in the form of a prediction block may be provided both to the subtractor 106 to generate a residual, and in the decoding loop to the adder 114 to add the prediction to the reconstructed residual from the inverse transform to reconstruct a frame.

The partitioner 104 or other initial units not shown may place frames in order for encoding and assign classifications to the frames, such as I-frame, B-frame, P-frame and so forth, where I-frames are intra-predicted. Otherwise, frames may be divided into slices (such as an I-slice) where each slice may be predicted differently. Thus, for HEVC or AV1 coding of an entire I-frame or I-slice, spatial or intra-prediction is used, and in one form, only from data in the frame itself.

In various implementations, the prediction unit 116 may perform an intra block copy (IBC) prediction mode and a non-IBC mode operates any other available intra-prediction mode such as neighbor horizontal, diagonal, or direct coding (DC) prediction mode, palette mode, directional or angle modes, and any other available intra-prediction mode. Other video coding standards, such as HEVC or VP9 may have different sub-block dimensions but still may use the IBC search disclosed herein. It should be noted, however, that the foregoing are only example partition sizes and shapes, the present disclosure not being limited to any particular partition and partition shapes and/or sizes unless such a limit is mentioned or the context suggests such a limit, such as with the optional maximum efficiency size as mentioned. It should be noted that multiple alternative partitions may be provided as prediction candidates for the same image area as described below.

The prediction unit 116 may select previously decoded reference blocks. Then comparisons may be performed to determine if any of the reference blocks match a current block being reconstructed. This may involve hash matching, SAD search, or other comparison of image data, and so forth. Once a match is found with a reference block, the prediction unit 116 may use the image data of the one or more matching reference blocks to select a prediction mode. By one form, previously reconstructed image data of the reference block is provided as the prediction, but alternatively, the original pixel image data of the reference block could be provided as the prediction instead. Either choice may be used regardless of the type of image data that was used to match the blocks.

The predicted block then may be subtracted at subtractor 106 from the current block of original image data, and the resulting residual may be partitioned into one or more transform blocks (TUs) so that the transform and quantizer 108 can transform the divided residual data into transform coefficients using discrete cosine transform (DCT) for example. Using the quantization parameter (QP) set by the system 100, the transform and quantizer 108 then uses lossy resampling or quantization on the coefficients. The frames and residuals along with supporting or context data block size and intra displacement vectors and so forth may be entropy encoded by the coder 110 and transmitted to decoders.

In one or more embodiments, a system 100 may have, or may be, a decoder, and may receive coded video data in the form of a bit stream and that has the image data (chroma and luma pixel values) and as well as context data including residuals in the form of quantized transform coefficients and the identity of reference blocks including at least the size of the reference blocks, for example. The context also may include prediction modes for individual blocks, other partitions such as slices, inter-prediction motion vectors, partitions, quantization parameters, filter information, and so forth. The system 100 may process the bit stream with an entropy decoder 130 to extract the quantized residual coefficients as well as the context data. The system 100 then may use the inverse transform and quantizer 132 to reconstruct the residual pixel data.

In one or more embodiments, system 100 then may use an adder 134 (along with assemblers not shown) to add the residual to a predicted block. The system 100 also may decode the resulting data using a decoding technique employed depending on the coding mode indicated in syntax of the bit stream, and either a first path including a prediction unit 136 or a second path that includes a filter 138. The prediction unit 136 performs intra-prediction by using reference block sizes and the intra displacement or motion vectors extracted from the bit stream, and previously established at the encoder. The prediction unit 136 may utilize reconstructed frames as well as inter-prediction motion vectors from the bit stream to reconstruct a predicted block. The prediction unit 136 may set the correct prediction mode for each block, where the prediction mode may be extracted and decompressed from the compressed bit stream.

In one or more embodiments, the coded data 122 may include both video and audio data. In this manner, the system 100 may encode and decode both audio and video.

It is understood that the above descriptions are for purposes of illustration and are not meant to be limiting.

Figure 2:
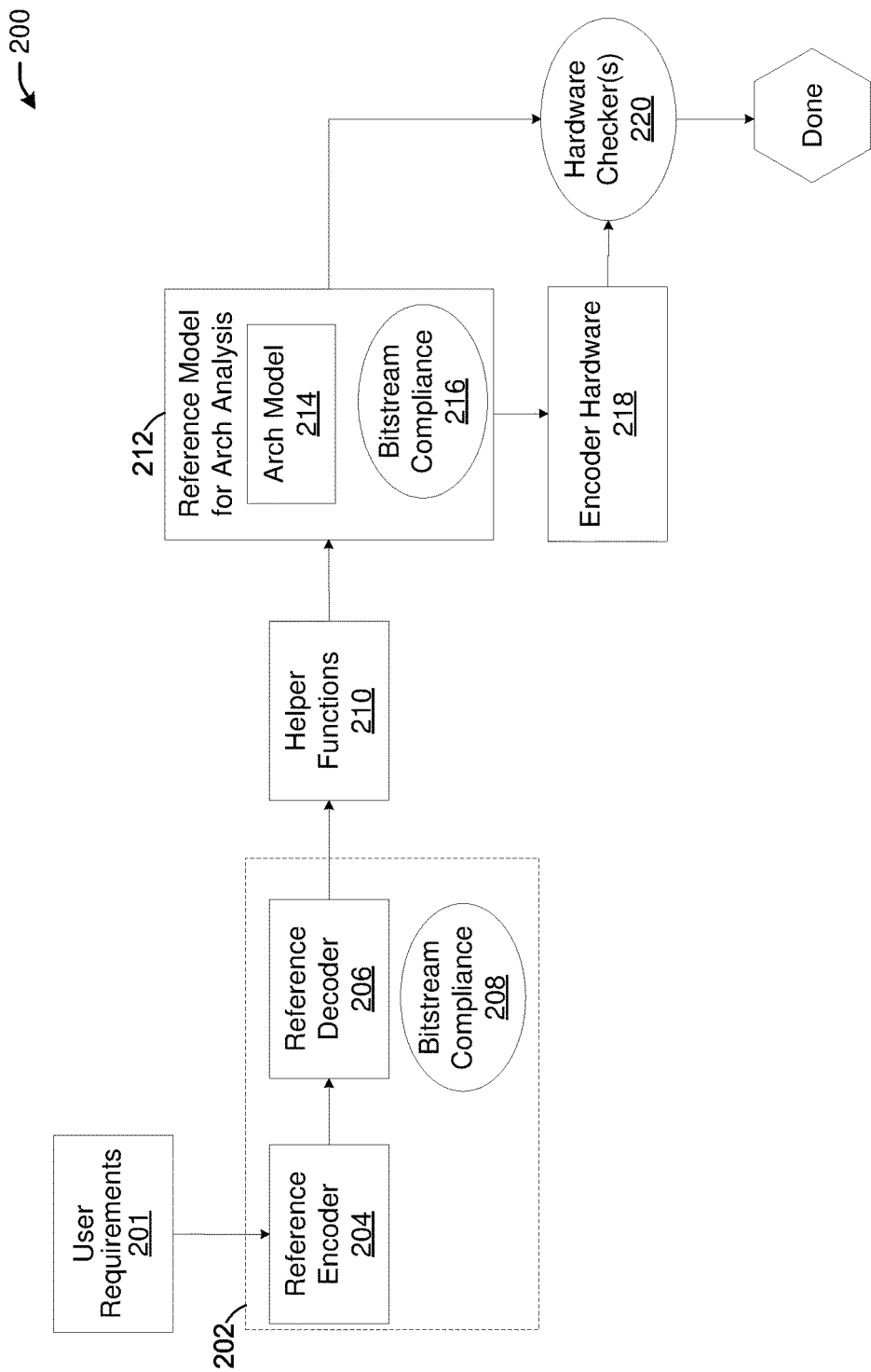
FIG. 2 illustrates an example flow diagram, in accordance with one or more embodiments of the disclosure.

FIG. 2 illustrates an example flow diagram 200, in accordance with one or more embodiments of the disclosure.

Particularly, FIG. 2 illustrates a flow diagram 200 associated with a validation system that uses an external reference codec tool 202. In one or more embodiments, some encoder validation systems use external reference codec tools 202 and helper functions 210. These external reference codec tools 202 and helper functions 210 are configured to produce encoder parameters that are compliant with a given video coding specification. For example, the encoding parameters may include factors such as bitrate, rate distortion or scene characteristics, prediction and/or transform partition or block sizes, available prediction mode types, and best mode selection parameters, as well as any other parameters that may be used by an encoder to determine how to encode video content. Using the encoding parameters, the transform and quantizer may generate and quantize transform units to facilitate encoding by the coder, which may generate coded data that may be transmitted (e.g., an encoded bit stream). The reference codec tool 202 may receive one or more user requirements 201 as inputs. The user requirements 201 may specify information relating to use cases that a user may wish to validate. For example, the user requirements 201 may include information such as video resolution, etc. The reference codec tool 202 includes a reference encoder 294 and a reference decoder 206 that are configured for the particular codec that is being validated. Thus, a source image or video and user requirements 201 may be provided to the reference encoder 204 as inputs, and the reference encoder 204 may encode the data included within the source image or video according to the particular video codec. The encoded data may then be provided to the reference decoder 206, which may decode the encoded data to produce the encoder parameters. The reference codec tool 202 may also include a bit stream compliance component 208 to verify whether any data included within the reference codec tool is compliant with the video codec specification. Finally, the one or more helper functions 210 may convert the encoder parameters produced by the reference decoder 206 into a syntax that is usable by a reference model 212 (described below).

Additionally, a given reference codec tool 202 may only be configured for a single type of video codec. For example, a first external reference codec tool may be configured to produce encoder parameters that may be used for validation of the encoder 218 with respect to a first type of codec, and a second external reference codec tool may be configured to produce encoder parameters that may be used for validation of the encoder 218 with respect to a second type of codec. Thus, it may be required to physically swap different reference codec tools 202 in order to validate an encoder against different types of video codecs. This can be a time-consuming process that may require multiple different external tools 202 in order to perform validation of the encoder 218 with respect to various types of video codecs.

Continuing through the conventional encoder validation system process, the output of the codec tool 202 and helper function 210 may be provided to a reference model 212, which may be a software simulation. The reference model 212 may represent an emulation of desired hardware encoder functionality (that is, the desired functionality of the encoder being validated). The reference model 212 may receive at least the source image or video and/or the encoder parameters produced by the reference codec tool 202. The reference model 212 may then provide these encoder parameters and the source image or video to the encoder 218 being validated. The reference model 212 may also encode the source image or video based on the encoding parameters to produce reference encoded outputs. These reference encoded outputs may represent the desired encoded output that should be produced by the encoder being validated. These reference encoded outputs may be provided to a hardware checker 220 that may also receive the actual encoded outputs produced by the encoder being validated. The reference encoded outputs may then be compared to the actual encoded outputs to determine if the encoded outputs produced by the encoder being validated are the correct outputs.

Figure 3:
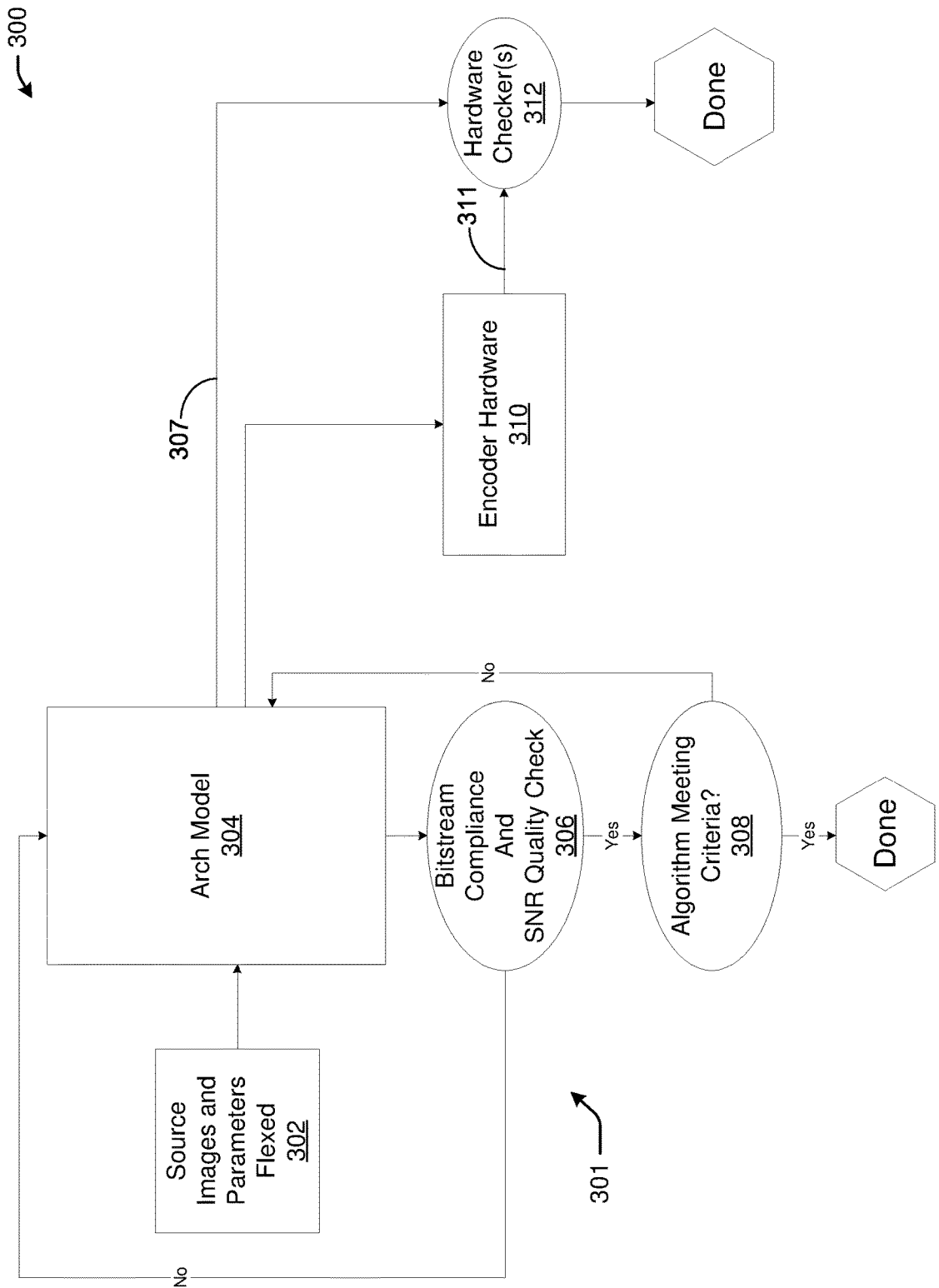
FIG. 3 illustrates an example flow diagram, in accordance with one or more embodiments of the disclosure.

FIG. 3 illustrates an example flow diagram 300, in accordance with one or more embodiments of the disclosure.

In contrast with the approach to encoder validation illustrated in the flow diagram 200 of FIG. 2, the flow diagram 300 may illustrate operations performed by an improved validation system that may eliminate the need for external reference codec tools and/or helper functions. By doing so, the hardware requirements to perform validation of an encoder may be reduced and the complexity of the validation system may be reduced, among other advantages.

In one or more embodiments, the validation system associated with the flow diagram 300 may similarly include a reference model 304. Before this reference model 304 is used to produce simulated encoded video outputs that may be compared against the outputs produced by the encoder hardware 310, the reference model 304 may need to be trained to produce proper reference outputs. That is, the ultimate goal may be to ensure that the reference model 304 is able to produce simulated encoded video content that is compliant with a given video codec given a source image or video and a particular set of encoding parameters. This may be necessary so that the reference model 304 may then be able to produce an encoded video output that may be used as a point of comparison against any outputs produced by the encoder hardware (for example, the hardware being validated) during validation. To accomplish this, the feedback loop 301 may iteratively generate source image or videos and/or encode parameters 302 to train the reference model 304. In one or more embodiments, the validation may be performed without requiring the external reference codec tools by leveraging a feedback loop 301 that is used to train the reference model 304 to also validate the encoder hardware 310. That is, this feedback loop 301 may provide dual functionality, whereas the validation system associated with the flow diagram 200 may involve training a reference model, and then incorporating the external codec tool 202 to perform the validation.

In one or more embodiments, the feedback loop 301 may train the reference model 304 as follows. The feedback loop 301 may begin with a first training iteration involving the generation of a first set of encoding parameters 302. Some or all of the encoding parameters may be generated by the reference model itself 304 and/or some or all of the encoding parameters may be generated by software that is separate from the reference model 304. In some embodiments, high-level encoding parameters, such as video resolution, sequence level, bit depth, etc. may be generated by external software and lower-level parameters, such as TU size, for example, may be generated by the reference model. However, these are merely examples, and any of the encoding parameters may be generated using the reference model 304 as well. A source image or video may also be generated or an existing source image or video may be provided to the reference model 304 as an input. Given these inputs, the reference model 304 may then encode the source image or video based on the first set of encoding parameters 302 to produce an encoded video output. For example, this encoding process may involve similar processes as those described as being performed by the system 100 illustrated in FIG. 1.

In one or more embodiments, the encoded video output may then pass through a first verification stage 306 and/or a second verification stage 308. The first verification stage may involve a bit stream compliance determination and/or a signal-to-noise quality check. Bit stream compliance may be checked by decoding the generated bitstream using reference decoder model. Quality checks such as signal-to-noise ratio anstatistics-related related functions may be embedded inside the reference encoder model. The second verification stage 308 may involve a determination as to whether the algorithm is meeting a certain set of criteria. This check may be used during the development of the architectural model. If the architectural model does not meet quality and other statistical checks for a certain set of input parameters, the architectural model may be revisited and modified to reach the quality limits. If the encoded video output produced by the reference model 304 fails the first verification stage 306 or the second verification stage 308, then the feedback loop 301 may proceed through a second iteration. In some cases, the second iteration may involve generation of new encoding parameters 302. However, the second iteration may also involve usage of the same source image or video and/or same encoding parameters 302 to ensure that the encoded video output produced by the reference model 304 for that given source image or video and/or encoding parameters 302 is proper. This process may continue until the reference model 304 is determined (for example, through the first verification stage 306 and/or the second verification stage 308) to produce the proper output.

In one or more embodiments, this process of verifying that the properly encoded video output is being produced by the reference model 304 may be performed for a multiplicity of source image or videos and/or video encoding parameters 302. That is, it may not be sufficient that the reference model 304 is able to produce the properly encoded video output for single use cases including a single image and/or set of encoding parameters. Rather, the reference model may need to be able to generateproperlyr encoded video outputs for any source image or videos and/or video encoding parameters that may be provided as inputs. This is because the reference model 304 is ultimately used for validation of an encoder hardware 310, and the encoder hardware 310 will need to be validated against a large number of use cases to ensure that the encoder hardware 310 would function properly when used post-validation to encode video content. In order to ensure that all relevant use cases are covered in training the reference model 304 (or at least a threshold number of use cases, edge cases, etc.) the training of the reference model may be performed by generating random source image or videos and/or encoding parameters. In some cases, this randomization may be performed within certain boundaries. These boundaries may be established based on the particular video codec that the reference model is being trained to verify the encoder hardware against. For example, maximum and minimum frame height/width, bits per pixel, final bitstream size per frame. In some cases, the boundaries may not necessarily exactly match the codec-specific boundaries, but may also be based on hardware limitations as well. For example, if a specific codec requires encoding to be performed using 12 bits per pixel, but the hardware being used can only handle 10 bits per pixel, then the boundaries may be set to the 10 bits per pixel because they may still fall within the boundaries of the codec. In addition to the random generation, the system may also allow a user to manually input source image or videos and/or encoding parameters to ensure that use cases of interest are covered.

In one or more embodiments, the feedback loop may also include a coverage algorithm. The coverage algorithm may be used to determine whether all of the relevant use cases that may be required to properly train the reference model have been generated. Similarly, the coverage algorithm may also be used to determine whether all of the relevant use cases required to properly validate an encoder hardware have been covered.

Given the existence of this feedback loop 301 that is already capable of generating encoding parameters 302, instead of relying on external reference codec tools to generate codec-compliant encoding parameters, this same feedback loop 301 may also be used for generation of source images or videos and/or encode parameters 302 for purposes of validating the encode hardware as well. In this manner, the same software-based feedback loop 301 associated with the reference model 304 may be used to train the reference model 304 and generate encode parameters for validation of encoder hardware 310.

In one or more embodiments, the validation of the encoder hardware 310 may be performed as follows. First, a source image or video and/or video encoding parameters 302 may be generated. The generated source image or video and/or video encoding parameters 302 may be provided to the trained reference model 304. The trained reference model 304 may receive the generated source image or video and/or video encoding parameters 302 and may provide the generated source image or video and/or video encoding parameters 302 to the encoder hardware 310 (the hardware that is being validated). The trained reference model 304 may also encode the source image or video based on the generated video encoding parameters 302 and may produce a reference encoded video output 307. This reference encoded video output 307 may be provided to a hardware checker 312. The encoder hardware 310 may also encode the source image or video based on the same video encoding parameters used by the reference model 304 to encode the source image or video. Based on this, the encoder hardware 310 may produce a second encoded video output 311. This second encoded video output 311 may also be provided to the hardware checker 312. The hardware checker 312 may then compare the reference encoded video output 307 and the second encoded video output 311. In some cases, it may be important for the reference encoded video output 307 and the second encoded video output 311 to be identical to ensure that the encoder hardware 310 is producing properly encoded video outputs such that a user consuming the video content may be presented with high-quality content that is representative of the source content. However, in some cases, some amount of error may be acceptable, and the hardware checker 312 may simply determine whether the reference encoded video output 307 and the second encoded video output 311 are within a threshold similarity of one another.

In one or more embodiments, reference model outputs may be stored in buffers inside the reference model for each of the major interfaces. These buffer outputs may then be rearranged and printed in a log files in the same order the outputs of the hardware for different interfaces. During simulation, checkers for each of the hardware major interfaces may compare reference model output in the log file with the hardware output for each data transactions.

As with the training of the reference model 304, this process may be iterated in order to ensure that all relevant use cases are covered in training the reference model 304 (or at least a threshold number of use cases, edge cases, etc.) the training of the reference model may be performed by generating random source image or videos and/or encoding parameters. In some cases, this randomization may be performed within certain boundaries. These boundaries may be established based on the particular video codec that the reference model is being trained to verify the encoder hardware against. For example, in addition to the random generation, the system may also allow a user to manually input source images or videos and/or encoding parameters to ensure that use cases of interest are covered.

In one or more embodiments, the feedback loop may also include a coverage algorithm. The coverage algorithm may be used to determine whether all of the relevant use cases that may be required to properly train the reference model have been generated. Similarly, the coverage algorithm may also be used to determine whether all of the relevant use cases required to properly validate an encoder hardware have been covered.

Figure 4:
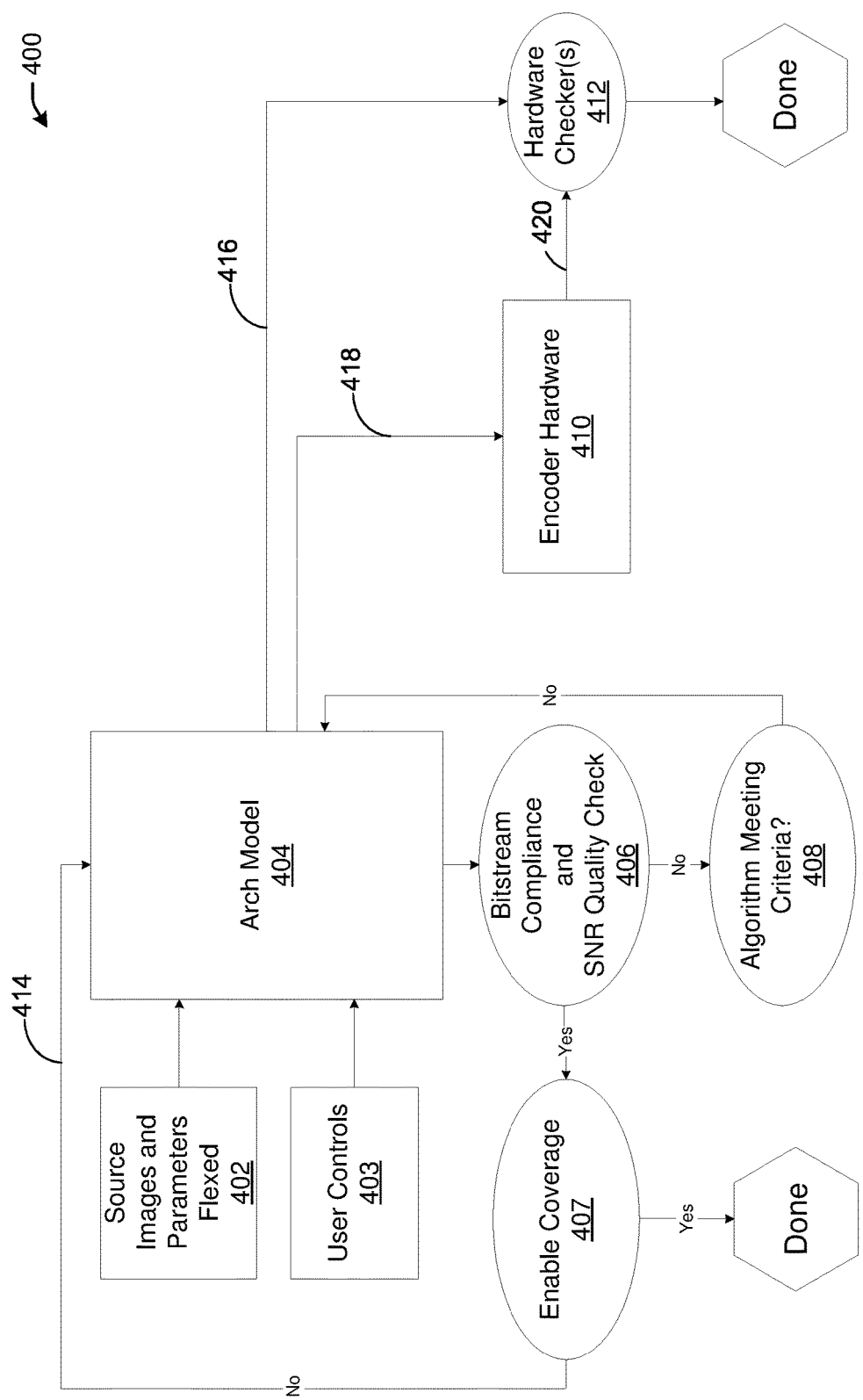
FIG. 4 illustrates an example flow diagram, in accordance with one or more embodiments of the disclosure.

FIG. 4 illustrates an example flow diagram 400, in accordance with one or more embodiments of the disclosure.

The flow diagram 400 may include similar elements as the flow diagram 300 of FIG. 3. The flow diagram 400 may differ from the flow diagram 300 in that the flow diagram 400 depicts the coverage algorithm 407 and the manual inputs 403 provided by a user during training and/or validation.

Figure 5:
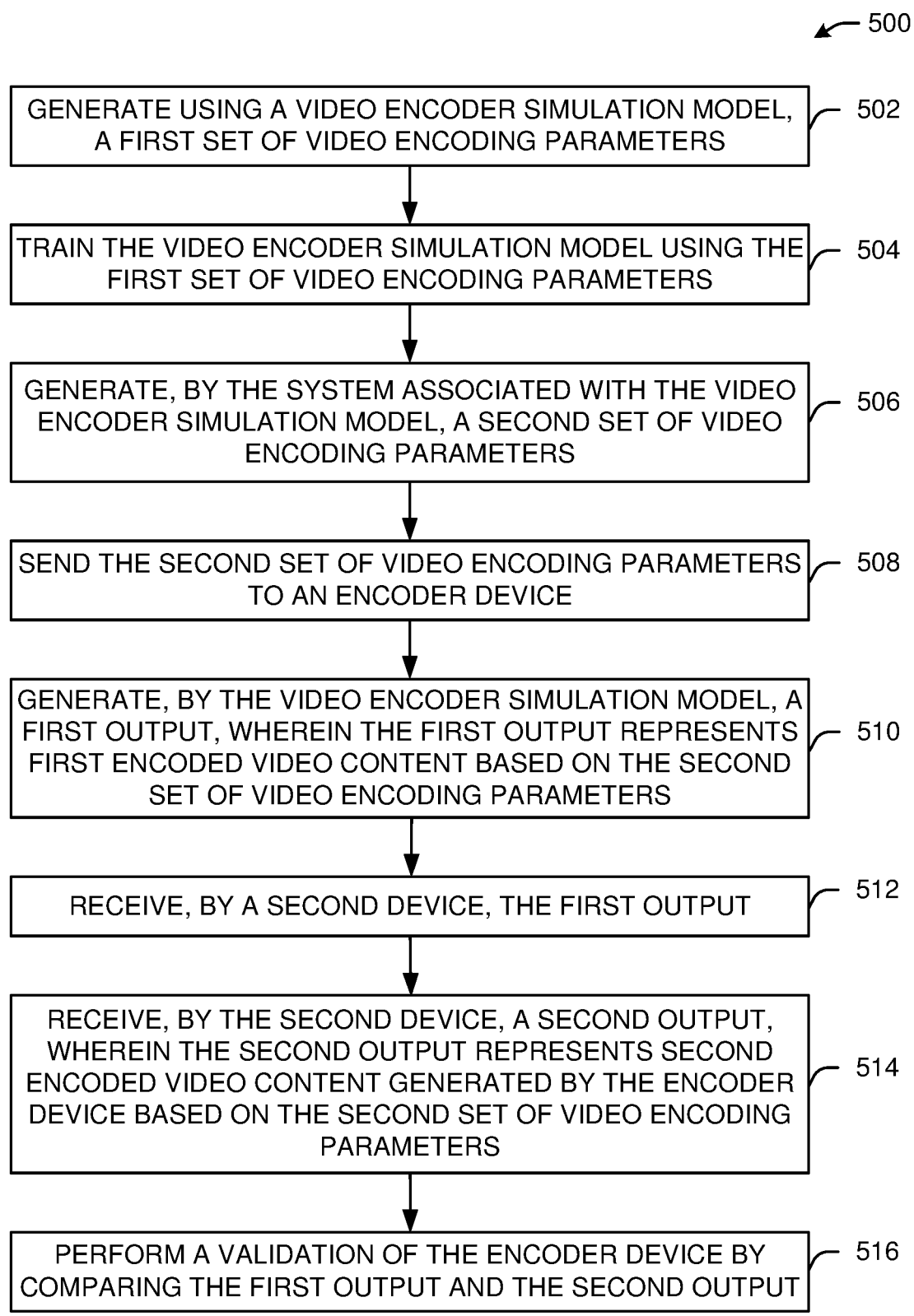
FIG. 5 illustrates an example method, in accordance with one or more embodiments of this disclosure.

FIG. 5 illustrates an example method 500, in accordance with one or more embodiments of this disclosure.

Block 502 of the method 500 may include generating, using a video encoder simulation model, a first set of video encoding parameters. Block 504 of the method 500 may include training the video encoder simulation model using the first set of video encoding parameters. Block 506 of the method 500 may include generating, by the system associated with the video encoder simulation model, a second set of video encoding parameters. Block 508 of the method 500 may include sending the second set of video encoding parameters to an encoder device. Block 510 of the method 500 may include generating, by the video encoder simulation model, a first output, wherein the first output represents first encoded video content based on the second set of video encoding parameters. Block 512 of the method 500 may include receiving, by a second device, the first output. Block 514 of the method 500 may include receiving, by the second device, a second output, wherein the second output represents second encoded video content generated by the encoder device based on the second set of video encoding parameters. Block 516 of the method 500 may include performing a validation of the encoder device by comparing the first output and the second output.

In one or more embodiments, the first set of video encoding parameters are randomly generated. In one or more embodiments, the first set of video encoding parameters are randomly generated within one or more boundaries, wherein the one or more boundaries are based on a first video codec. In one or more embodiments, training the video encoder simulation model is further based on a third set of video encoding parameters, wherein the third set of video encoding parameters are manually generated by a user. In one or more embodiments, training the video encoder simulation model and/or performing the validation of the encoder device further comprises determining that a threshold number of video encoding parameters were generated. IN one or more embodiments, the video encoder simulation model is further trained using a first image or video.

In one or more embodiments, the method 500 further comprises generating, by the video encoder simulation model, a third output based on the first set of video encoding parameters. The method 500 further comprises comparing the third output to a reference output based on a first video codec. The method 500 further comprises determining that the third output and the reference output are different. The method 500 further comprises generating, by the video encoder simulation model, a fourth output based on the first set of video encoding parameters. The method 500 further comprises comparing the fourth output to the reference output. The method 500 further comprises determining that the fourth output and the reference output are the same.

Figure 6:
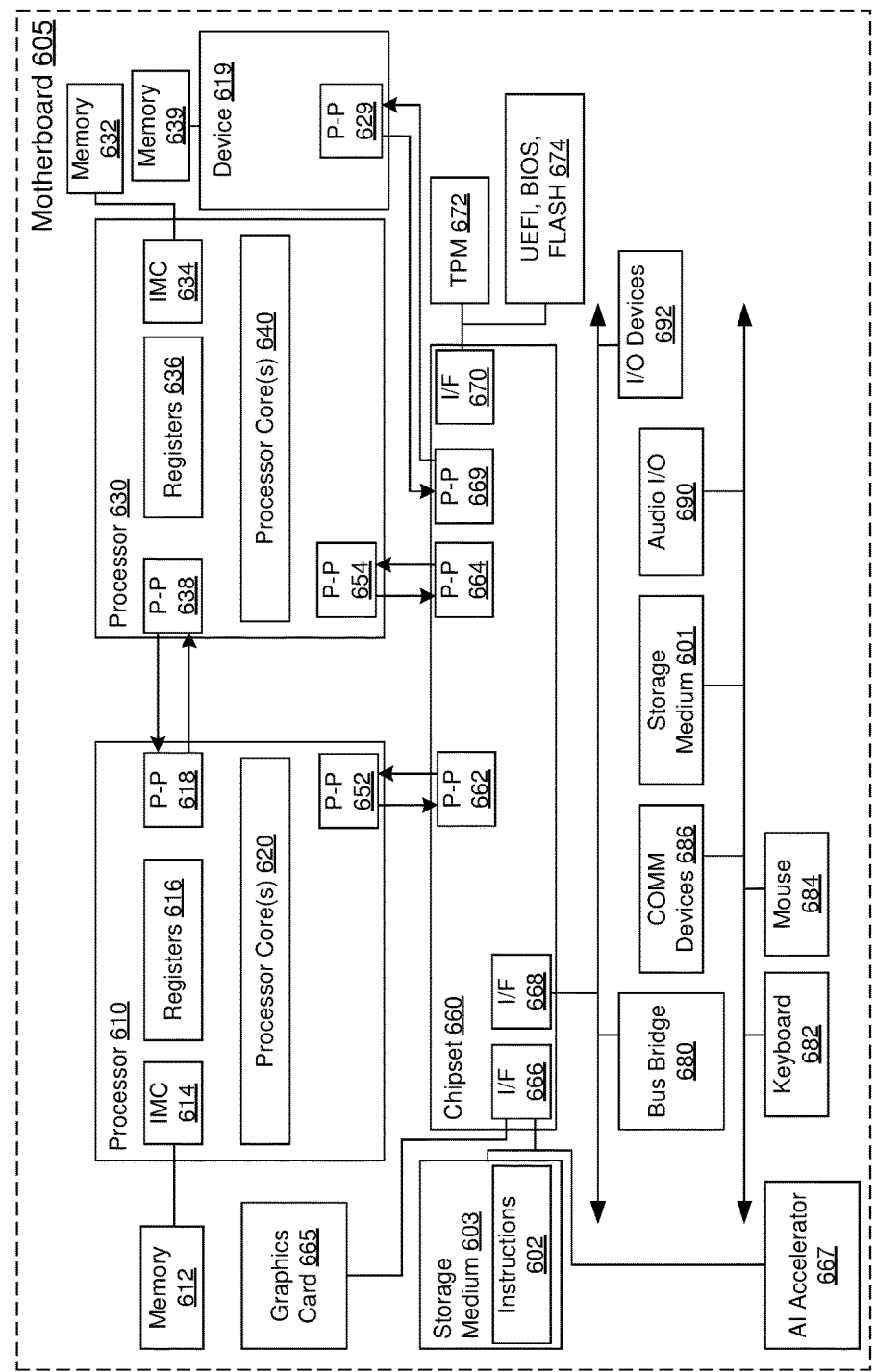
FIG. 6 illustrates an example of a computing system, in accordance with one or more embodiments of this disclosure.

FIG. 6 illustrates an embodiment of an exemplary system 600, in accordance with one or more example embodiments of the present disclosure.

In various embodiments, the system 600 may comprise or be implemented as part of an electronic device.

In some embodiments, the system 600 may be representative, for example, of a computer system that implements one or more components of FIG. 1.

The embodiments are not limited in this context. More generally, the system 600 is configured to implement all logic, systems, processes, logic flows, methods, equations, apparatuses, and functionality described herein and with reference to the figures.

The system 600 may be a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other devices for processing, displaying, or transmitting information. Similar embodiments may comprise, e.g., entertainment devices such as a portable music player or a portable video player, a smartphone or other cellular phones, a telephone, a digital video camera, a digital still camera, an external storage device, or the like. Further embodiments implement larger-scale server configurations. In other embodiments, the system 600 may have a single processor with one core or more than one processor. Note that the term "processor" refers to a processor with a single core or a processor package with multiple processor cores.

In at least one embodiment, the computing system 600 is representative of one or more components of FIG. 1. More generally, the computing system 600 is configured to implement all logic, systems, processes, logic flows, methods, apparatuses, and functionality described herein with reference to the above figures.

As used in this application, the terms "system" and "component" and "module" are intended to refer to a computer-related entity, either hardware, a combination of hardware and software, software, or software in execution, examples of which are provided by the exemplary system 600. For example, a component can be but is not limited to being, a process running on a processor, a processor, a hard disk drive, multiple storage drives (of optical and/or magnetic storage medium), an object, an executable, a thread of execution, a program, and/or a computer.

By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 600 comprises a motherboard 605 for mounting platform components. The motherboard 605 is a point-to-point (P-P) interconnect platform that includes a processor 610, a processor 630 coupled via a P-P interconnects/interfaces as an Ultra Path Interconnect (UPI), and a device 619. In other embodiments, the system 600 may be of another bus architecture, such as a multi-drop bus. Furthermore, each of processors 610 and 630 may be processor packages with multiple processor cores. As an example, processors 610 and 630 are shown to include processor core(s) 620 and 640, respectively. While the system 600 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 610 and the chipset 660. Some platforms may include additional components and some platforms may only include sockets to mount the processors and/or the chipset.

The processors 610 and 630 can be any of various commercially available processors, including without limitation an Intel® Celeron®, Core®, Core (2) Duo®, Itanium®, Pentium®, Xeon®, and XScale® processors; AMD® Athlon®, Duron®, and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processors 610, and 630.

The processor 610 includes an integrated memory controller (IMC) 614 and P-P interconnects/interfaces 618 and 652. Similarly, the processor 630 includes an IMC 634 and P-P interconnects/interfaces 638 and 654. The WIC's 614 and 634 couple the processors 610 and 630, respectively, to respective memories, a memory 612, and a memory 632. The memories 612 and 632 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 612 and 632 locally attach to the respective processors 610 and 630.

In addition to the processors 610 and 630, the system 600 may include a device 619. The device 619 may be connected to chipset 660 by means of P-P interconnects/interfaces 629 and 669. The device 619 may also be connected to a memory 639. In some embodiments, the device 619 may be connected to at least one of the processors 610 and 630. In other embodiments, the memories 612, 632, and 639 may couple with the processor 610 and 630, and the device 619 via a bus and shared memory hub.

System 600 includes chipset 660 coupled to processors 610 and 630. Furthermore, chipset 660 can be coupled to storage medium 603, for example, via an interface (I/F) 666. The I/F 666 may be, for example, a Peripheral Component Interconnect-enhanced (PCI-e). The processors 610, 630, and the device 619 may access the storage medium 603 through chipset 660.

Storage medium 603 may comprise any non-transitory computer-readable storage medium or machine-readable storage medium, such as an optical, magnetic, or semiconductor storage medium. In various embodiments, storage medium 603 may comprise an article of manufacture. In some embodiments, storage medium 603 may store computer-executable instructions, such as computer-executable instructions 602 to implement one or more of processes or operations described herein, (e.g., process XY00 of FIG. XY). The storage medium 603 may store computer-executable instructions for any equations depicted above. The storage medium 603 may further store computer-executable instructions for models and/or networks described herein, such as a neural network or the like. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable types of code, such as source code, compiled code, interpreted code, executable code, static code, dynamic code, object-oriented code, visual code, and the like. It should be understood that the embodiments are not limited in this context.

The processor 610 couples to a chipset 660 via P-P interconnects/interfaces 652 and 662 and the processor 630 couples to a chipset 660 via P-P interconnects/interfaces 654 and 664. Direct Media Interfaces (DMIs) may couple the P-P interconnects/interfaces 652 and 662 and the P-P interconnects/interfaces 654 and 664, respectively. The DMI may be a high-speed interconnect that facilitates, e.g., eight Giga Transfers per second (GT/s) such as DMI 3.0. In other embodiments, the processors 610 and 630 may interconnect via a bus.

The chipset 660 may comprise a controller hub such as a platform controller hub (PCH). The chipset 660 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 660 may comprise more than one controller hub such as a chipset with a memory controller hub, a graphics controller hub, and an input/output (I/O) controller hub.

In the present embodiment, the chipset 660 couples with a trusted platform module (TPM) 672 and the UEFI, BIOS, Flash component 674 via an interface (I/F) 670. The TPM 672 is a dedicated microcontroller designed to secure hardware by integrating cryptographic keys into devices. The UEFI, BIOS, Flash component 674 may provide pre-boot code.

Furthermore, chipset 660 includes the I/F 666 to couple chipset 660 with a high-performance graphics engine, graphics card 665. The graphics card 665 may implement one or more of processes or operations described herein, (e.g., process 1000 of FIG. 10), and may include components of FIGS. 1-3 (e.g., the partitioner 104 of FIG. 1, the subtractor 106 of FIG. 1, the transform and quantizer 108 of FIG. 1, the coder 50 of FIG. 1, the inverse transform and quantizer 112 of FIG. 1, the adder 114 of FIG. 1, the prediction unit 116 of FIG. 1, the control 121 of FIG. 1, etc.). In other embodiments, the system 600 may include a flexible display interface (FDI) between the processors 610 and 630 and the chipset 660. The FDI interconnects a graphics processor core in a processor with the chipset 660.

Various I/O devices 692 couple to the bus 681, along with a bus bridge 680 that couples the bus 681 to a second bus 691 and an I/F 668 that connects the bus 681 with the chipset 660. In one embodiment, the second bus 691 may be a low pin count (LPC) bus. Various devices may couple to the second bus 691 including, for example, a keyboard 682, a mouse 684, communication devices 686, a storage medium 601, and an audio I/O 690.

The artificial intelligence (AI) accelerator 667 may be circuitry arranged to perform computations related to AI. The AI accelerator 667 may be connected to storage medium 601 and chipset 660. The AI accelerator 667 may deliver the processing power and energy efficiency needed to enable abundant data computing. The AI accelerator 667 is a class of specialized hardware accelerators or computer systems designed to accelerate artificial intelligence and machine learning applications, including artificial neural networks and machine vision. The AI accelerator 667 may be applicable to algorithms for robotics, internet of things, other data-intensive and/or sensor-driven tasks.

Many of the I/O devices 692, communication devices 686, and the storage medium 601 may reside on the motherboard 605 while the keyboard 682 and the mouse 684 may be add-on peripherals. In other embodiments, some or all the I/O devices 692, communication devices 686, and the storage medium 601 are add-on peripherals and do not reside on the motherboard 605.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, yet still co-operate or interact with each other.

In addition, in the foregoing Detailed Description, various features are grouped together in a single example to streamline the disclosure. This method of disclosure is not to be interpreted as reflecting an intention that the claimed examples require more features than are expressly recited in each claim. Rather, as the following claims reflect, the inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories that provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions that, when executed by a processing system, perform a desired operation or operations.

Logic circuitry, devices, and interfaces herein described may perform functions implemented in hardware and implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chipset, memory, or the like. Integrated circuits include circuits created on a substrate such as a silicon wafer and may comprise components. Integrated circuits, processor packages, chip packages, and chipsets may comprise one or more processors.

Processors may receive signals such as instructions and/or data at the input(s) and process the signals to generate at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language, and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:
1. A system comprising:
memory;
computer-executable instructions; and
processor circuitry to be programmed based on the computer-executable instructions to:

generate, with a video encoder simulation model, a first set of video encoding parameters;
train the video encoder simulation model based on the first set of video encoding parameters;
generate, with the video encoder simulation model, a second set of video encoding parameters;
provide the second set of video encoding parameters to an encoder device;
generate, with the video encoder simulation model, a first output representative of first encoded video content based on the second set of video encoding parameters;
obtain a second output representative of second encoded video content from the encoder device, the second output based on the second set of video encoding parameters;
perform a validation of the encoder device based on the first output and the second output;
generate, with the video encoder simulation model, a third output based on the first set of video encoding parameters;
compare the third output to a reference output, the reference output based on a first video codec;
determine that the third output and the reference output are different;
generate, with the video encoder simulation model, a fourth output based on the first set of video encoding parameters;
compare the fourth output to the reference output; and
determine that the fourth output corresponds to the reference output.

2. The system of claim 1, wherein the processor circuitry is to generate the first set of video the processor circuitry is to generate encoding parameters randomly.

3. The system of claim 2, wherein the processor circuitry is to generate the first set of video encoding parameters randomly within one or more boundaries, wherein the one or more boundaries are based on the first video codec.

4. The system of claim 1, wherein the processor circuitry is to train the video encoder simulation model based on a third set of video encoding parameters, the third set of video encoding parameters generated manually.

5. The system of claim 1, wherein the processor circuitry is to at least one of train the video encoder simulation model perform the validation of the encoder device based on a determination that a threshold number of video encoding parameters were generated.

6. The system of claim 1, wherein the processor circuitry is to train the video encoder simulation model based on a least one of a first image or a first video.

7. A method comprising:
generating, with a video encoder simulation model, a first set of video encoding parameters;
training the video encoder simulation model based on the first set of video encoding parameters;
generating, with the video encoder simulation model, a second set of video encoding parameters;
sending the second set of video encoding parameters to an encoder device;
generating, with the video encoder simulation model, a first output representative of first encoded video content based on the second set of video encoding parameters;
obtaining a second output representative of second encoded video content from the encoder device, the second output based on the second set of video encoding parameters;
performing a validation of the encoder device based on the first output and the second output;
generating, with the video encoder simulation model, a third output based on the first set of video encoding parameters;
comparing the third output to a reference output, the reference output based on a first video codec;
determining that the third output and the reference output are different;
generating, with the video encoder simulation model, a fourth output based on the first set of video encoding parameters;
comparing the fourth output to the reference output; and
determining that the fourth output corresponds to the reference output.

8. The method of claim 7, wherein the generating of the first set of video encoding parameters includes generating the first set of video encoding parameters randomly.

9. The method of claim 8, wherein the generating of the first set of video encoding parameters includes generating the first set of video encoding parameters randomly within one or more boundaries, wherein the one or more boundaries are based on the first video codec.

10. The method of claim 7, wherein the training of the video encoder simulation model is further based on a third set of video encoding parameters, the third set of video encoding parameters generated manually.

11. The method of claim 7, wherein at least one of the training of the video encoder simulation model or the performing of the validation of the encoder device is based on determining that a threshold number of video encoding parameters were generated.

12. The method of claim 7, wherein the training of the video encoder simulation model is based on at least one of a first image or a first video.

13. A non-transitory computer-readable medium storing comprising computer-executable instructions cause processor circuitry to at least:
generate, with a video encoder simulation model, a first set of video encoding parameters;
train the video encoder simulation model based on the first set of video encoding parameters;
generate, with the video encoder simulation model, a second set of video encoding parameters;
provide the second set of video encoding parameters to an encoder device;
generate, with the video encoder simulation model, a first output representative of first encoded video content based on the second set of video encoding parameters;
obtain a second output, representative of second encoded video content from the encoder device, the second output based on the second set of video encoding parameters;
performing a validation of the encoder device based on the first output and the second output;
generate, with the video encoder simulation model, a third output based on the first set of video encoding parameters;
compare the third output to a reference output, the reference output based on a first video codec;
determine that the third output and the reference output are different;
generate, with the video encoder simulation model, a fourth output based on the first set of video encoding parameters;
compare the fourth output to the reference output; and determine that the fourth output corresponds to the reference output.

14. The non-transitory computer-readable medium of claim 13, wherein the computer-executable instructions are to cause the processor circuitry to generate the first set of video encoding parameters randomly.

15. The non-transitory computer-readable medium of claim 14, wherein the computer-executable instructions are to cause the processor circuitry to generate the first set of video encoding parameters randomly within one or more boundaries, wherein the one or more boundaries are based on the first video codec.

16. The non-transitory computer-readable medium of claim 13, wherein the computer-executable instructions are to cause the processor circuitry to train the video encoder simulation model based on a third set of video encoding parameters, the third set of video encoding parameters generated manually.

17. The non-transitory computer-readable medium of claim 13, wherein the computer-executable instructions are to cause the processor circuitry to at least one of train the video encoder simulation model or perform the validation of the encoder device based on a determination that a threshold number of video encoding parameters were generated.

* * * * *

UNITED STATES PATENT AND TRADEMARK OFFICE
CERTIFICATE OF CORRECTION

PATENT NO. : 12,470,726 B2
APPLICATION NO. : 17/644253
DATED : November 11, 2025
INVENTOR(S) : Renangi et al.

Page 1 of 1

It is certified that error appears in the above-identified patent and that said Letters Patent is hereby corrected as shown below:

In the Claims

Column 22, Line 26 (Claim 10), delete "further"

Signed and Sealed this
Twenty-seventh Day of January, 2026

John A. Squires
*Director of the United States Patent and Trademark Office*